United States Patent [19]
Uemura

[11] 3,838,492
[45] Oct. 1, 1974

[54] METHOD AND APPARATUS FOR REMOVING BEAD WIRES FROM A TIRE

[75] Inventor: Taiichiro Uemura, Kobe, Japan

[73] Assignee: Kobe Steel, Ltd., Kobe, Japan

[22] Filed: Sept. 28, 1973

[21] Appl. No.: 401,623

[30] Foreign Application Priority Data
Sept. 28, 1972 Japan.............................. 47-97781

[52] U.S. Cl....................... 29/427, 29/403, 157/13, 225/2, 225/93
[51] Int. Cl............................................ B23p 19/02
[58] Field of Search................ 254/50.1, 50.2, 50.3; 29/403, 427, 200 R, 200 B; 225/93; 157/13

[56] References Cited
UNITED STATES PATENTS

| | | | |
|---|---|---|---|
| 2,230,302 | 2/1941 | Leguillon | 157/13 |
| 2,298,685 | 10/1942 | Davis | 157/13 |
| 3,650,012 | 3/1972 | Graveman | 29/403 |
| 3,701,296 | 10/1972 | Snow | 157/13 |
| 3,733,941 | 5/1973 | Geyer | 157/13 |
| 3,750,261 | 8/1973 | Iglehart et al | 29/427 |

*Primary Examiner*—Charles W. Lanham
*Assistant Examiner*—James R. Duzan
*Attorney, Agent, or Firm*—Oblon, Fisher, Spivak, McClelland & Maier

[57] ABSTRACT

A method and apparatus are provided for removing a ring-shaped bead wire from a tire by drawing the same through a die under a compulsory force effected between the bead wire and the die, wherein the die opening is of a configuration to prevent surrounding tire rubber to be pulled through with the bead wire.

9 Claims, 6 Drawing Figures

METHOD AND APPARATUS FOR REMOVING BEAD WIRES FROM A TIRE

BACKGROUND OF THE INVENTION

1. Field of the Invention:

The present invention relates to a method of removing a ring-shaped bead wire embedded in the bead part of a tire from the tire, and to an apparatus particularly designed for carrying out a bead-removing operation according to this method.

It is indispensable for the regeneration of a tire, and particularly a used tire, that the ring-shaped beam wire, embedded in the bead part of the tire, is removed from the tire. Such bead wires can then be reused as scrap iron if the rubber can be effectively removed therefrom.

2. Description of the Prior Art:

In the past, when the bead wire is removed from a tire, particularly a used tire, the surrounding part of the bead part itself of the tire has been cut with an edged tool or a fret saw, or punched by a ring-shaped punch, corresponding to the surrounding outlining shape of the bead part. However, these methods, while generally being successful, are not altogether satisfactory because of several problems involved therein.

For example, in the case of an edged tool being used to cut the bead part, the tool will soon wear out, while in the use of a fret saw, much time is required to perform the operation. With the punch, there is almost no universality and this shortcoming necessitates the requirement of several punching machines matching the different diameter beads of such tires being operated on, so that an enormous expense for equipment is experienced. Additionally, the edges of the blade of the edged tool, the fret saw and the punch wear very quickly. Further, in these cases, not only is the bead wire removed, but also the surrounding area of the bead part in which this bead wire is embedded. Therefore, a large amount of tire rubber is attached all over the peripheral face of the removed bead wire, so that the bead wire cannot be completely separated and itself only removed by such conventional methods. In these cases, many problems occur in the treatment of the tire rubber attached to the bead wire, and hence the removal of bead wires according to these former practices is not entirely satisfactory.

SUMMARY OF THE INVENTION

Accordingly, it is an object of the present invention to provide a method of removing bead wires from tires so that a minimum amount of tire rubber will be attached to the bead wires or removed therewith from the tire.

Another object is to provide an improved method of removing bead wires from tires without using an edged tool for cutting.

Still another object of the invention is to provide an improved method of removing bead wires from tires which is fast, inexpensive and keeps to a minimum the amount of tire rubber removed from the tire with the bead wire.

Yet a further object of the present invention is the provision of an apparatus particularly designed for carrying out the method described herein and capable of removing a bead wire from a tire while removing only a minimum amount of surrounding tire rubber.

The foregoing objects and others are achieved by passing the bead wire through a die, through which the bead wire passes while being hackled, and pulling the bead wire out from the tire by a compulsory force effected between the bead wire and the die. In order to practice the inventive method more effectively, the compulsory force between the bead wire and the die may be effected by a hook member movable through the die, a part of the bead wire being hung on the hook while the hook is passed through the die, and then, the hook is pulled out from the die to completely remove the bead wire, or alternatively, it is pushed through the die. Further, the shape of the die is made so that only the bead wire may be passed through the opening therethrough, or the bead wire and the hook, whereby the removal of rubber from the tire with the bead wire is precluded.

When the bead wire is dragged out of a tire as mentioned above, an excessive force is required at the end of the dragging process due to the ring-shaped configuration of the bead wire. In some occasions, the tire rubber eats into the die and even breakage of the bead wire may occur. It is the object of the present invention to make the bead wire pass through the die perfectly and in safety, even if the above-mentioned phenomenon appears, in order to remove the bead wire more effectively. For this purpose, the bead wire may be caught after the hook has passed through the die, whereby the total length of the bead wire can be passed through the die even if the bead wire is broken. If the rear end part of the bead wire is previously cut before passing through the die, the bead wire can thus be pulled out from the die by a small force. Even further, the shape of the die may be made having a channel corresponding in shape to that of the bead wire to be passed, or being ring-shaped.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference numerals designate like or corresponding parts throughout the several views, and wherein.

DESCRIPTION OF THE PREFERRED EMBODIMENTS

Figure 1:
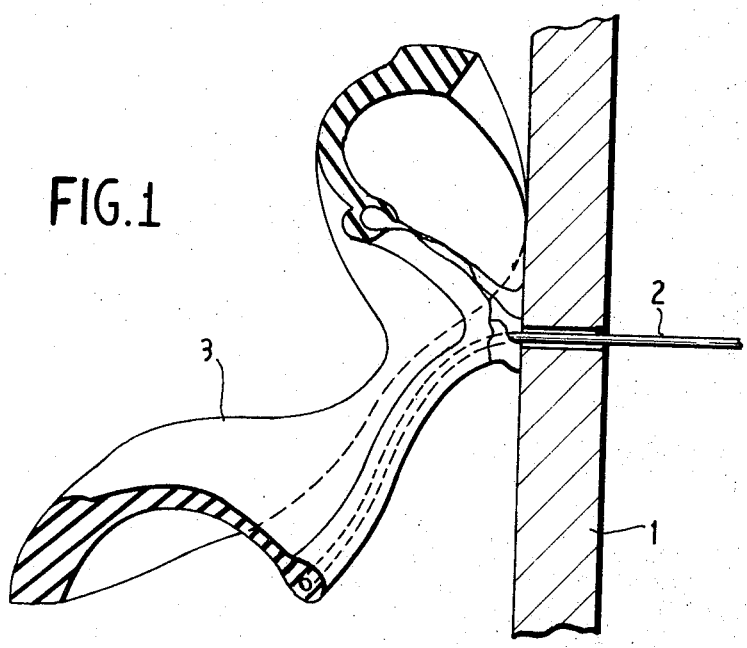
FIG. 1 is a cross-sectional view, illustrating a basic example of an embodiment of the present invention showing the bead wire of a tire being passed through a die member.

Referring now to the drawings, and more particularly to FIG. 1, a part of a bead wire 2 is shown being passed through a die member 1 through which the bead wire 2 can alone be passed narrowly, and a compulsory drawing force is effected between the bead wire 2 and the die 1, whereby the whole bead wire 2 is passed or drawn through the die 1 so that the bead wire 2 can be removed from a tire 3. The shape of the die 1 is so made as to permit the bead wire 2 to alone pass with some difficulty, and the mechanical strength of the bead wire 2 is very great as compared with that of other parts of the tire 3. Therefore, the other parts of the tire 3 having tire rubber as the main ingredient, can be hackled away from the bead wire 2 at the inlet of the die 1. For this purpose, a part of the ring-shaped bead wire 2 is cut, and the one end is passed through the die, whereupon this end is gripped within a chuck, and in this manner, the bead wire 2 can be forcibly pulled or drawn out from the tire.

Figure 2:
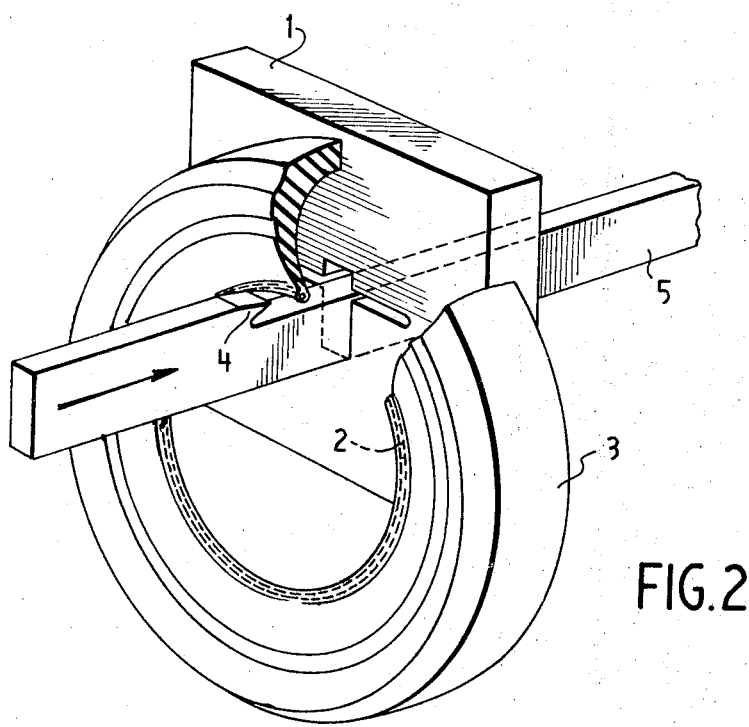
FIG. 2 is a perspective view, showing a bead wire, hung on a hook of the die member to be dragged out from the tire as it remains ring-shaped in configuration.

In the example shown in FIG. 2, the tire 3 or the outer peripheral portion thereof, in which the bead wire 2 is embedded in a ring-shaped configuration, is cut circumferentially and the bead wire 2 is alone passed through the die 1 directly from the disk portion of the tire 3, which is divided into halves, being cut on a plane perpendicular to the axis of the tire. The die 1 is provided with a hook 4 being disposed on a rod 5, and which is movable through the die. The hook 4 may thus be connected with a driving source, not shown, effecting a compulsory driving force between the hook 4 and the die 1 by way of the connecting rod 5. When the bead wire 2 is to be removed, the tire, or the half-tire 3, is set between the die 1 and the hook 4, which is in the condition of piercing the die. This condition is shown in FIG. 2. Then, the connecting rod 5 is moved so that the hook 4 may be passed through the die 1. Thus, the hook 4 catches a part of the ring-shaped bead wire 2 to make the bead wire 2 alone pass through the die. In this case, the shape of the die consists of the part necessary to pass the hook 4 and the part through which the bead wire 2 is passed. The part through which the bead wire 2 is passed is not limited to the sectional form of the bead wire 2 but can be achieved even by a slit, such as shown in FIG. 2, extending horizontally from the opening for the hook 4 and having vertical extent as large as the diameter of the bead wire 2 to permit passage of the same therethrough. Further, the die 1 may be divided and made movable, so that the shape of the die may be varied.

Figure 3:
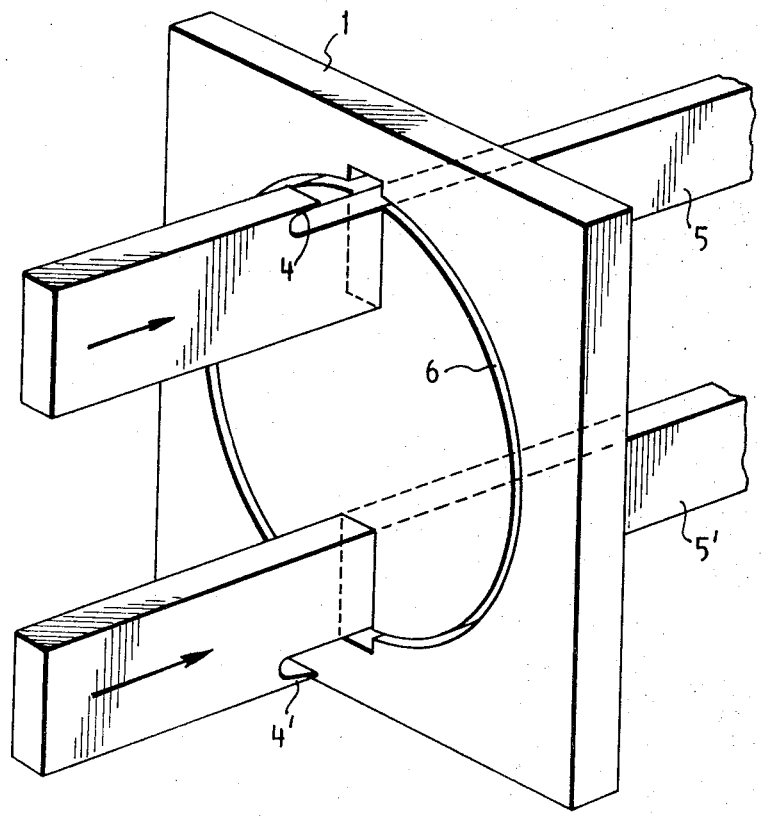
FIG. 3 is a perspective view, showing a case where the die, through which the bead wire is passed, is made ring-shaped in configuration also in a part thereof, corresponding to the shape of the bead wire to be passed, and having two hooks installed therein for attaching to the bead wire.

In the embodiment shown in FIG. 3, the part of the die 1 through which the bead wire is passed is ring-shaped in configuration and two hooks 4 and 4' are provided, openings being disposed in the die at diametrically opposite locations of the ring-shaped opening for the bead wire for permitting movement of the hooks therethrough. The process to remove the bead wire is the same as shown in the example of FIG. 2.

Thus, the tire, or the tire half, is set between the two hooks 4 and 4' and the die 1, and the bead wire is compulsorily pulled out through the ring-shaped channel 6 by moving both of the hooks 4 and 4' simultaneously. The other part of the tire is thereby hackled out smoothly from the bead wire. With this embodiment, tire rubber cannot clog the die to any meaningful degree and an excessive force is not required in the final stage of the process, as compared with that of FIG. 2.

Figure 4:
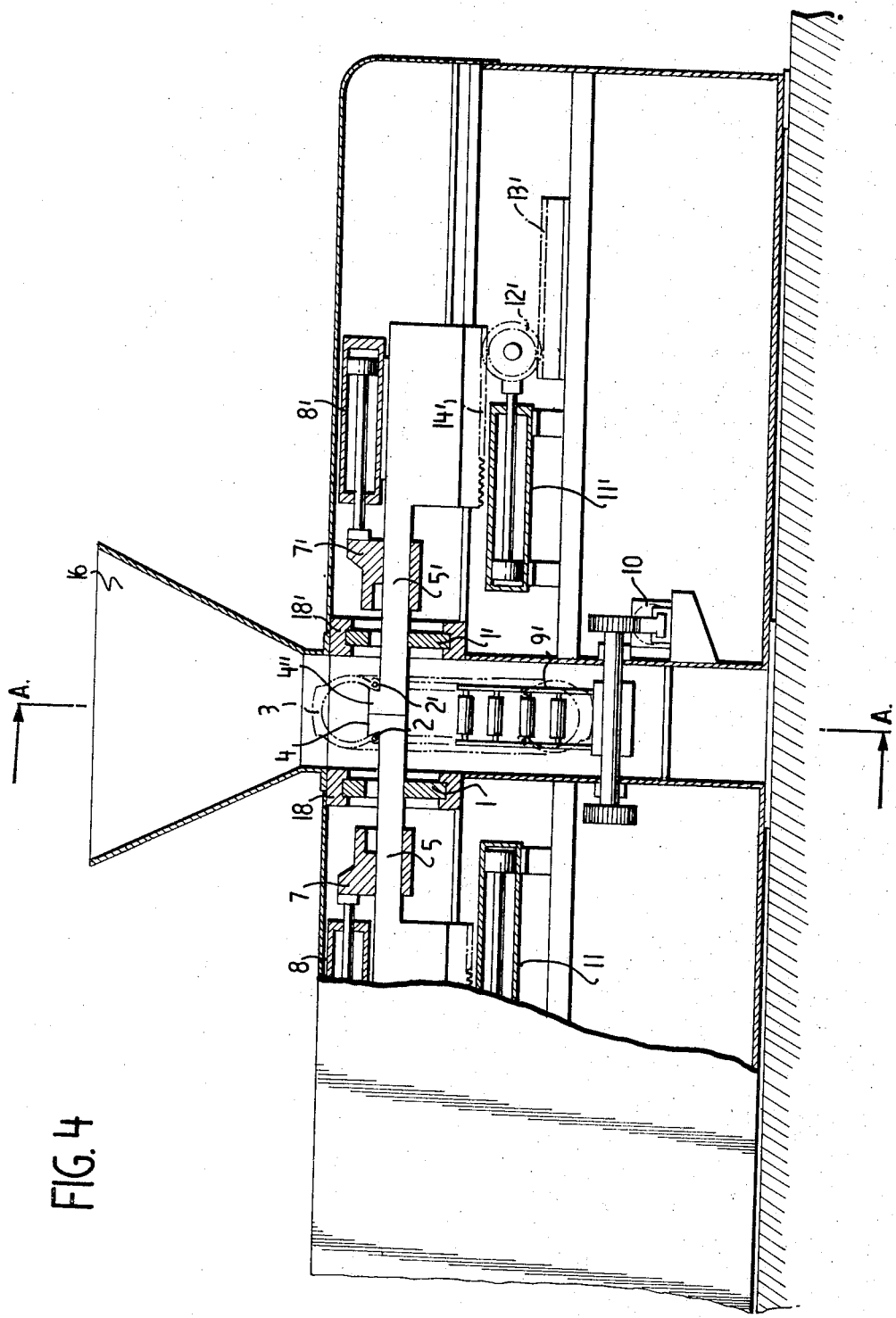
FIG. 4 is a view, partly in section, showing a more concrete example of an embodiment of the present invention for removing a bead wire.
Figure 5:
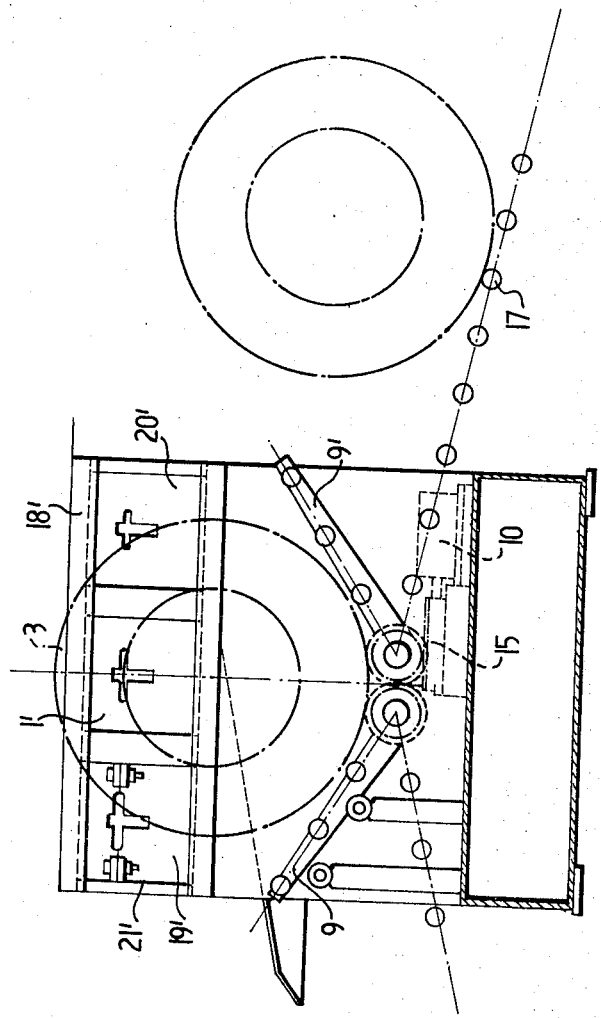
FIG. 5 is a sectional view taken along the line A—A of FIG. 4.
Figure 6:
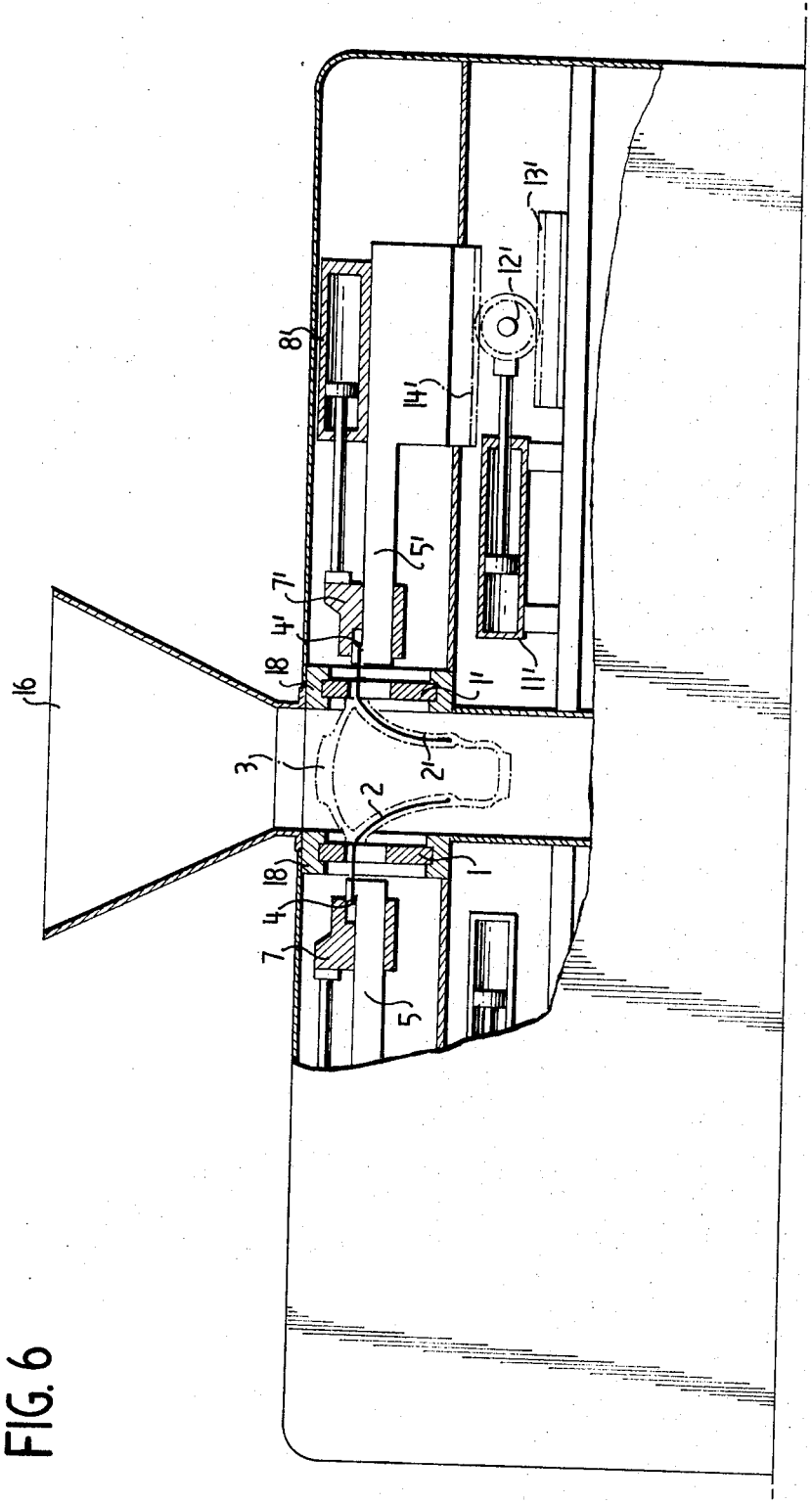
FIG. 6 is a view, partly in section, showing the bead wire being passed through the die in the example shown in FIG. 4.

Referring to the examples shown in FIGS. 4, 5 and 6, there shall be explained a method of removing a bead wire with an apparatus designed for performing the method. The apparatus shown in these examples comprises a pair of dies 1 and 1' and hooks 4 and 4'', respectively confronting each other, and enables the simultaneous removal of the two bead wires 2 and 2' embedded in both side walls of a tire 3. Also provided are holding mechanisms 7, 8 and 7', 8' for the dies 1 and 1', being formed of a retaining collar and an oil pressure cylinder, respectively, these mechanisms being designed to catch and retain a part of the bead wires 2 and 2' hung on the hooks 4 and 4'', as will be described in detail hereinafter, and a supporting mechanism composed of arms 9, 9' and motor 10 for supporting the tire 3 in a suitable position during carrying out the bead removal operation.

The hooks 4 and 4'' are movable through the dies 1 and 1' being driven by respective oil pressure cylinders 11 and 11' through the connecting rods 5 and 5'. Gears 12 and 12', which are supported on the ends of piston rods of the cylinders 11 and 11', will move in rotation according to the expansion and contraction of the oil pressure cylinders 11 and 11', and since, they are engaged with respective fixed racks 13 and 13' on the supporting bed and movable racks 14 and 14' secured to the connecting rods 5 and 5', they are operative to move the connectings rods 5 and 5' toward and away from the dies 1 and 1'. The connecting rods 5 and 5' are thereby moved to an extent substantially equal to twice the length of the expansion capacity of the oil pressure cylinders 11 and 11', or the lengths of the movement of the piston rods thereof.

The retaining collars 7 and 7' for catching the end part of the bead wires are slidable on the connecting rods 5 and 5', respectively, and are driven by the oil pressure cylinders 8 and 8' mounted on the connecting rods 5 and 5'. These collars are slidable over the hooks 4 and 4'' when the hooks are outside the dies 1 and 1', whereby after the hooks 4 and 4'' with the bead wires 2 and 2' engaged therein have passed out through the dies 1 and 1', the bead wires may be secured within the hooks by sliding the retaining collars over the hooks through operation of the oil pressure cylinders 8 and 8'. The collars 7 and 7' obviously may be moved without regard to the position of the connecting rods 5 and 5'.

Further, the supporting arms 9 and 9' support the tire 3 disposed in the dies 1 and 1'. These arms are shown in greater detail in FIG. 5, wherein it may be seen that rollers therebetween actually support the tire and that the arms themselves are pivotably mounted at their lower ends. By adjusting the angles of inclination of the supporting arms 9 and 9', the height of the bead wire of the tire can be adapted to the height of the dies 1 and 1', corresponding obviously to the size of the tire 3. The supporting arms 9 and 9' are driven by the motor 10 attached with a reducing gear 15 to transfer the rotation of the motor 10 to the supporting arms 9 and 9' in a reduced manner. The tire to be treated in this apparatus is charged from an upper hopper 16, and when stripped of its bead wires, it is discharged by a roller conveyor 17. The operation shall be explained in order as follows:

When a tire 3 is charged from the hopper 16, it falls onto the supporting arms 9 and 9', whereupon the motor 10 starts to operate and adjusts the opening provided by the supporting arms 9 and 9', so that the position of the tire 3 is adjusted for the bead part of the tire 3 to be disposed in a position corresponding to the dies 1 and 1'. The hooks 4 and 4'' are moved toward the center by operation of the oil pressure cylinders 11 and 11' and the tire 3 is then moved down a little so that the bead wires and the hooks 4 and 4'' may be engaged with each other. This condition is shown in FIG. 4. Then, the oil pressure cylinders 11 and 11' are operated to move the hooks 4 and 4'' in opposite directions, that is, outward from the center of the tire. The hooks 4 and 4'' thus pass through the openings in the dies 1 and 1' with the bead wires 2 and 2' caught therein. The die as indicated hereinbefore has an opening of such shape to pass only the hooks 4 and 4'' and the bead wires 2 and 2' therethrough. Therefore, the bead wires 2 and 2' are alone pulled out, while the other part of the tire 3 remains inside the dies 1 and 1'. Then, the oil pressure cylinders 8 and 8' are operated to move the collars 7 and 7' to cover the hooks 4 and 4'', whereby a part of each of the bead wires 2 and 2' is fixed to the respective one of the hooks 4 and 4', or securably retained therein by the retaining collars. It is possible to pull out the whole bead wire without being obstructed by the condition of the bead wire which remains inside the dies 1 and 1', for example, in the case of breakage of the wire, the clogging of tire rubber, and the like. Then the hooks 4 and 4'' are moved outward to completely remove the bead wires 2 and 2' from the tire 3, whereupon the removed bead wires 2 and 2' can be easily taken off the hooks 4 and 4'' by retracting the collars 7 and 7' from the hooks. The tire from which the bead wires 2 and 2' have been completely removed, is then moved on the roller conveyor 17 by releasing at least one of the supporting arms 9 and 9' to be discharged to the outside of the apparatus.

The dies 1 and 1' are so supported by die holders 18 and 18' as to be able to move perpendicularly to the moving direction of the hooks 4 and 4''. If the kind and size of a tire varies, the operation may be continued by replacing the dies 1 and 1' with another set of dies 19' and 20', merely by sliding the original dies aside and sliding the new dies into position, as shown in FIG. 5. Further, as shown by the die 19', the die may be divided and is so made that the gap may be adjusted by a screw 21'. Thus, the shape of the die can be made most suitable for hackling.

Obviously many modifications and variations of the present invention are possible in light of these teachings. It is to be understood therefore that within the scope of the appended claims, the invention may be practiced otherwise than as specifically described herein.

What is claimed as new and desired to be secured by Letters Patent of the United States is:

1. A method for removing a ring-shaped bead wire embedded in the bead part of a tire, comprising the steps of:
    mounting said tire on a die with said bead wire adjacent an opening in said die; and
    compulsorily pulling said bead wire through said die opening.
2. A method as set forth in claim 1, further comprising:
    first cutting said bead wire;
    passing one end of said cut bead wire through said die opening; and
    catching said one end of said bead wire on the other side of said die with a chuck for pulling the same compulsorily from said tire.
3. A method as set forth in claim 1, further comprising:
    hanging a part of said bead wire on a hook; and
    pulling said hook through the die opening with said bead wire being carried through said die opening on said hook.
4. An apparatus for removing a ring-shaped bead wire embedded in the bead part of a tire from said tire, comprising:
    a die;
    a connecting rod having a hook element thereon being movable through said die, and
    an actuator for reciprocably driving said connecting rod to move said hook element reciprocably through said die;
    wherein the opening in said die through which said hook element moves is of a configuration to permit passing therethrough of only said connecting rod, said hook element and said bead wire being carried by said hook element when said bead wire is being drawn out of said tire through said die.
5. An apparatus as set forth in claim 4, in which said die opening is ring-shaped in configuration in at least a part thereof to permit passage of the bead wire.
6. An apparatus as set forth in claim 4, further comprising an adjusting mechanism for said die for permitting different configurations of die openings to be made available to said connecting rod and hook element.
7. An apparatus as set forth in claim 4, further comprising a holding mechanism for retaining said bead wire on said hook element after the same is withdrawn through said die opening.
8. An apparatus as set forth in claim 7, wherein said holding mechanism comprises a retaining collar slidable on said connecting rod and having an opening of a size suitable to receive said connecting rod, said hook element and said bead wire only.
9. An apparatus as set forth in claim 7, further comprising means for adjustably supporting said tire to dispose said bead wire thereof in alignment with said die opening and said hook element movable therethrough.

* * * * *